United States Patent
Mody et al.

(10) Patent No.: US 12,111,780 B2
(45) Date of Patent: Oct. 8, 2024

(54) MULTI-CHANNEL SYSTEM ARCHITECTURE FOR MANAGING FLOW OF DATA AND ASSOCIATED TRACE INFORMATION

(71) Applicant: TEXAS INSTRUMENTS INCORPORATED, Dallas, TX (US)

(72) Inventors: Mihir Narendra Mody, Bengaluru (IN); Ankur Ankur, New Delhi (IN); Vivek Vilas Dhande, Jalgaon (IN); Kedar Satish Chitnis, Bengaluru (IN); Niraj Nandan, Plano, TX (US); Brijesh Jadav, Bengaluru (IN); Shyam Jagannathan, Bengaluru (IN); Prithvi Shankar Yeyyadi Anantha, Bengaluru (IN); Santhanakrishnan Narayanan Narayanan, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 130 days.

(21) Appl. No.: 17/677,638

(22) Filed: Feb. 22, 2022

(65) Prior Publication Data

US 2023/0267084 A1 Aug. 24, 2023

(51) Int. Cl.
| | |
|---|---|
| *G06F 13/28* | (2006.01) |
| *G06F 9/48* | (2006.01) |
| *G06F 13/16* | (2006.01) |
| *G06F 13/42* | (2006.01) |
| *G06F 15/78* | (2006.01) |

(52) U.S. Cl.
CPC ............ *G06F 13/28* (2013.01); *G06F 9/4881* (2013.01); *G06F 13/1673* (2013.01); *G06F 13/4221* (2013.01); *G06F 15/7807* (2013.01)

(58) Field of Classification Search
CPC .. G06F 13/28; G06F 13/1673; G06F 13/4221; G06F 13/42; G06F 13/38; G06F 13/4273; G06F 13/4282; G06F 9/4881
See application file for complete search history.

(56) References Cited

U.S. PATENT DOCUMENTS

| | | | | |
|---|---|---|---|---|
| 9,830,245 | B2 * | 11/2017 | Hanssen | G06F 11/348 |
| 10,402,223 | B1 * | 9/2019 | Santan | G06F 9/4881 |
| 2002/0194401 | A1 * | 12/2002 | Sakugawa | G06F 13/30 |
| | | | | 710/28 |
| 2006/0095674 | A1 * | 5/2006 | Twomey | G06F 9/30181 |
| | | | | 712/E9.055 |
| 2011/0202801 | A1 * | 8/2011 | Horley | G06F 11/348 |
| | | | | 714/45 |
| 2014/0095846 | A1 * | 4/2014 | Mayer | G06F 11/3476 |
| | | | | 712/E9.032 |

(Continued)

*Primary Examiner* — Raymond N Phan
(74) *Attorney, Agent, or Firm* — Michael T. Gabrik; Frank D. Cimino (57) ABSTRACT

A system-on-chip (SoC) in which trace data is managed includes a first memory device, a first interface to couple the first memory to a second memory external to the system-on-chip, and a first processing resource coupled to the first interface and the first memory device. The first processing resource includes a data buffer and a first direct access memory (DMA) controller. The first DMA controller transmits data from the data buffer to the first interface over a first channel, and transmits the data from the data buffer with associated trace information for the data to the first memory device over a second channel.

20 Claims, 6 Drawing Sheets

(56) References Cited

U.S. PATENT DOCUMENTS

| | | | |
|---|---|---|---|
| 2014/0359374 A1* | 12/2014 | Shirlen | G06F 11/3656 |
| | | | 714/45 |
| 2015/0127994 A1* | 5/2015 | Sankar | G06F 11/3636 |
| | | | 714/45 |
| 2015/0220393 A1* | 8/2015 | Broderick | G06F 11/3466 |
| | | | 714/766 |
| 2016/0274187 A1* | 9/2016 | Menon | G06F 11/3466 |
| 2018/0373656 A1* | 12/2018 | Kuwabara | G06F 13/28 |
| 2022/0197804 A1* | 6/2022 | Brett | G06F 11/3476 |

* cited by examiner

MULTI-CHANNEL SYSTEM ARCHITECTURE FOR MANAGING FLOW OF DATA AND ASSOCIATED TRACE INFORMATION

BACKGROUND

In some systems, such as Advance Driver Assistance Systems (ADAS), multiple high bandwidth sensors may be used for computer vision techniques. These sensors may include, for example, cameras, radars, light detection and ranging (LIDAR) systems, and the like. Data collected from these sensors may be used, for example, for perception of surrounding areas, automated driving assistance, etc. The data may be processed through dedicated hardware accelerators ("HWAs").

At times, it may be desirable to capture live data as it is transmitted within a system, thereby "tracing" the data through the various capture and processes. By capturing such trace data, a designer can test new processing techniques or replay data through the system. In addition, trace information may be desirable during playback, for example, to mimic actual sensor data. Capture and playback of sensor data may be useful, for example, to improve automated driving algorithms.

SUMMARY

This disclosure relates to a system-on-chip (SoC) that includes one or more HWAs, an on-chip memory, and one or more interface modules. The one or more HWAs are configured to receive sensor data from one or more sensors. The one or more HWAs are configured to transmit the sensor data to external memory and the on-chip memory, and the interface modules are configured to read the sensor data from the on-chip memory and transmit the sensor data from the SoC.

The disclosure also relates to a system for managing trace data that includes an HWA having a first buffer and a first scheduler, an on-chip event bus, and a first direct memory access (DMA) controller and second DMA controller at SoC level outside HWA. The first DMA controller is communicably coupled to the first HWA over the event bus and configured to read a first set of data from the first buffer of the first HWA and transmit the first set of data to external memory using a first channel. The channel may include hardware, such as dedicated buffers reserved for the channel, or may be an abstraction, such as a channel associated with an identifier. The first DMA is controller is also configured to transmit the first set of data to on-chip memory using a second channel. The second DMA controller can be configured to communicate to the first DMA controller over the event bus and configured to read the first set of data from the on-chip memory and transmit the first set of data via an interface associated with the second DMA controller. In another embodiment, the first and second DMA controllers can be physically identical single DMA controllers but use different channels corresponding to first and second for data transfer. In yet another embodiment, the first DMA controller can be hardwired logic doing data transfer rather than generic DMA Controller.

This disclosure also relates to a method for managing trace data. The method includes reading, to a first buffer of a first HWA, a first set of sensor data from one or more sensors, transmitting the first set of sensor data from the first HWAs to a first DMA controller and providing, by the first channel of the first DMA controller, the first set of sensor data to memory, which is typically external dynamic random access memory (DRAM). The method also includes providing, by the second channel of first DMA controller, the first set of sensor data to on-chip memory, directing, by the second DMA controller, a second DMA controller to read the first set of sensor data from the on-chip memory, and transmitting the first set of sensor data via an interface associated with the second DMA controller over communication interface (e.g., peripheral component interconnect express (PCIE), camera serial interface 2 (CSI2), Display).

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

The following description is directed to a technique for unobtrusively capturing trace data on a system-on-chip (SoC), according to one or more embodiments using existing SoC, without usage of trace resourcing of SoC for high bandwidth data. According to some embodiments, a high bandwidth data tracing utilizes system resources in a manner which affects the performance of the system. As such, a traced system acts differently than an untraced system. An unobtrusive capture of trace data uses a unique architecture such that performance of the system is not affected. In particular, in some embodiments, an improved architecture may be used to manage trace data for the capture and processing of sensor and/or HWA data on an SoC. By unobtrusively tracing data, the performance of the SoC is not impacted by tracing functionality.

Embodiments described herein are directed to providing an event interface within an SoC encompassing various high throughput trace source and sinks. In addition, on-chip memory may be used to store the data from the sources along with trace information. The on-chip memory may be configured to be used for trace data as well as algorithm data for use when processing the sensor data. The share of the on-chip memory for trace data and algorithm data may be dynamically modified; for example, memory allocation may be modified by software in some embodiments.

According to some embodiments, the SoC includes one or more processing resources, such as HWAs, each having an internal buffer, a scheduler, and a DMA controller. The various HWAs may be individual components configured to perform specific tasks. For example, in some embodiments, the SoC may include HWAs configured to perform image processing functions, machine learning techniques, optical flow, and the like. The HWA processes data, and the scheduler of a given HWA causes the DMA controller to transmit data from the internal buffer to the common on-chip memory within an SoC. A first DMA channel transmits the data to an external memory interface (e.g., DRAM), whereas a second DMA channel transmits the data to on-chip memory along with trace information associated with the data. The second DMA controller reads data from a common on-chip buffer memory and sends out the data to external interface (e.g., PCIE, CSI2) for tracing. The first and second DMA controller use events to inform production and consumption of data at smaller sizes (granularity). In some embodiments, the on-chip memory allows the SoC to capture not only the transmitted sensor data but also intermediate data. Intermediate data is a processed version of sensor data. For example, an HWA may perform a Fourier transform of the sensor data to convert the time-domain data to the frequency domain for analysis. The scheduler monitors for the completion of writes of data to external memory and on-chip memory prior to removing the data from internal buffer on the HWA as well as availability of internal memory for allow adding data on it. The scheduler receives signals over the event bus indicating completion of the transmission events or sends signals over the event bus indicating data availability.

According to some embodiments, techniques described herein allow tracing high bandwidth masters without relying on compression and without interfering with the operation of algorithms being run that utilize the sensor data. As such, embodiments described herein allow for unintrusive tracing of sensor data processing. In addition, the techniques described herein allow for flexibility in recording and tracking trace data. Further, the techniques described herein provide the flexibility to throttle input and/or output to manage data flow without any underflow and overflow.

Figure 1:
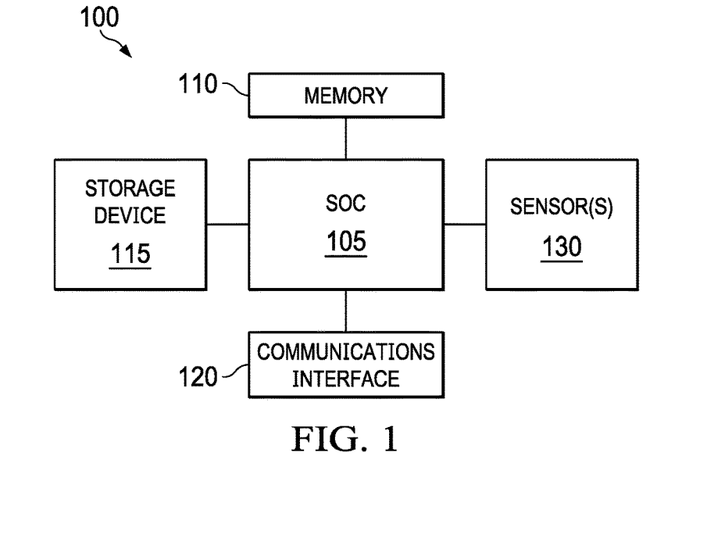
FIG. 1 illustrates a block diagram of a computing system, according to one or more embodiments.

The trace technique may be performed in a computing device. As illustrated in FIG. 1, the computing device 100 includes an SOC 105 coupled to a memory 110, storage device 115, sensor 130 and/or communications interface 120. The SOC 105 may include one or more processing resources, such as an HWA, configured to perform specialized functions. For example, an ADAS may include an SOC 105 which uses data from sensor(s) 130 for machine vision techniques, for example to enable safer driving. Sensor(s) 130 may include, for example, cameras, radars, LIDARs, and the like. In some embodiments, SOC include application specific HWAs configured to perform machine vision algorithms, such as image signal processing, optical flow, Fast Fourier Transform, object detection, and the like. According to some embodiments, the SOC 105 is configured to provide trace functionality to transfer and store trace data. According to one or more embodiments, SOC 105 may include one or more programmable processors, where each processor may have a single or multiple processor cores. Examples of processors include, but are not limited to, a central processing unit (CPU) or a microprocessor or digital signal processor (DSP). Although not illustrated in FIG. 1, the processing elements that make up SoC 105 may also include one or more other types of hardware processing components, such as graphics processing units (GPUs), application-specific HWAs, field-programmable gate arrays (FPGAs), and/or DSPs.

FIG. 1 illustrates that memory 110 may be operatively and communicatively coupled to SOC 105. Memory 110 may be a nontransitory computer readable storage medium configured to store various types of data. For example, memory 110 may include one or more volatile devices such as random access memory (RAM). Storage devices 115 includes nonvolatile storage such as solid-state storage (e.g., electrically programmable read only memory (EEPROM) and/or any other type of memory that maintains data after a power loss or shutdown operation. The nonvolatile storage devices 115 may be used to store programs that are loaded into the memory 110 when such programs are executed.

Stored data, i.e., data stored by a storage device 115, may be accessed by SOC 105 during the execution of computer-executable instructions or process steps to instruct one or more components within the computing device 100. Storage device 115 may be partitioned or split into multiple sections that may be accessed by different software programs. For example, storage device 115 may include a section designated for specific purposes, such as storing program instructions or data for updating software of the computing device 100. In certain cases, the computing device 100 may include multiple operating systems. For example, the computing device 100 may include a general-purpose or real-time operating system which is utilized for normal operations. The computing device 100 may include a bootloader for performing specific tasks, such as upgrading and recovering the operating system, and allowing access to the computing device 100 at a level generally not available through the operating system. Both the operating system and bootloader may have access to the section of storage 115 designated for specific purposes.

The one or more communications interfaces 120 may include a Peripheral Component Interconnect (PCI), Serial Peripheral Interface (SPI), Camera Serial Interface (CSI), or Display (DSI, DP) communications interface for interfacing with one or more other SoC or board components. In certain cases, elements coupled to the processor may be included on hardware shared with the processor. For example, the communications interface 120, storage device 115, and memory 110 may be included, along with other elements such as memory, in a single chip or package, such as an SoC.

Figure 2:
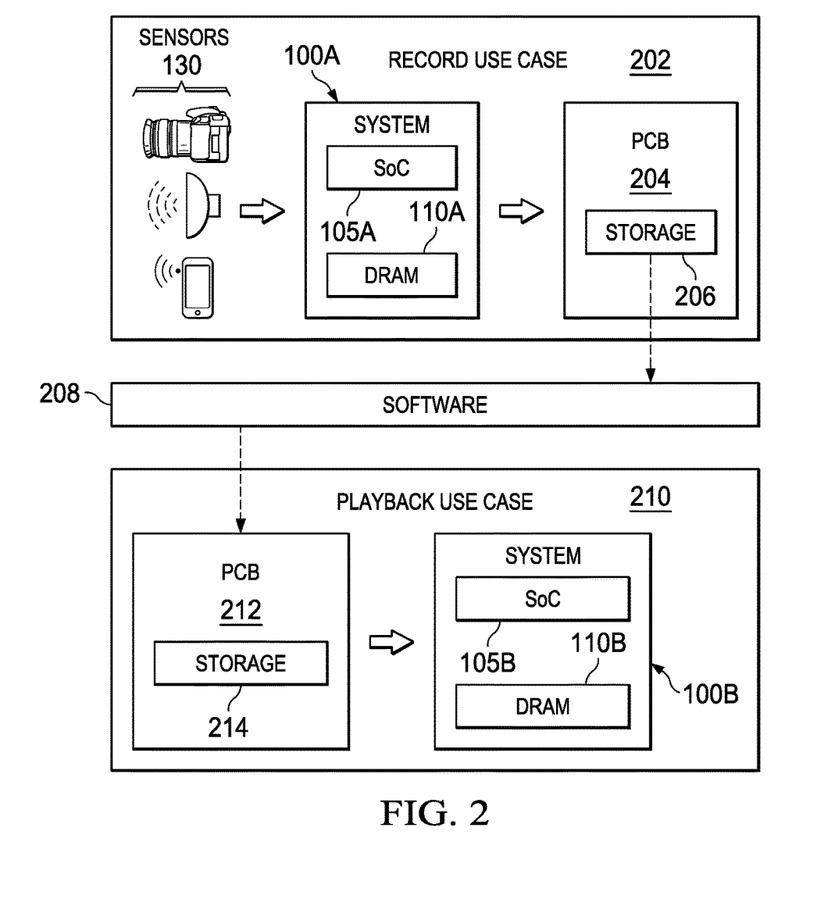
FIG. 2 depicts an example system diagram in which sensor data may be traced to enable record and playback, according to one or more embodiments.

FIG. 2 depicts an example flow diagram 200 in which data may be traced for playback, according to one or more embodiments. During a record use case 202, data may be collected, for example, from one or more sensors 130. Sensors 130 may include high bandwidth sensors, such as cameras, radar, LIDAR, and the like. The data may then be processed (e.g., for perception of surroundings) by various HWAs within an SoC 105A of a system 100A. In some embodiments, the capture of the data and/or the HWA processing data (e.g., from various places in processing) may be recorded as trace data without utilizing DRAM 110A, thereby allowing DRAM 110A to be used for the various processes and not be affected by the trace. According to some embodiments, the trace data for high bandwidth masters can be transmitted to a storage 206 on a PCB 204 over a high bandwidth interface (PCIE, CSI2, Display).

Once captured, the trace data in storage 206 may be managed by software 208. Specifically, the software can be used to read, display, edit the trace data, and the like. In a playback use case 210, software 208 may be used to feed in captured sensor data to storage 214 on PCB 212. The captured sensor data may then be used by system 100B as if system 100B were capturing data from sensors 130. As such, the performance of SoC 105B and DRAM 110B may be monitored to mimic the performance of SoC 105A and DRAM 110A using the same sensor data. Accordingly, a nonintrusive trace is provided which avoids using resources affecting the performance of the system which is being traced.

Figure 3:
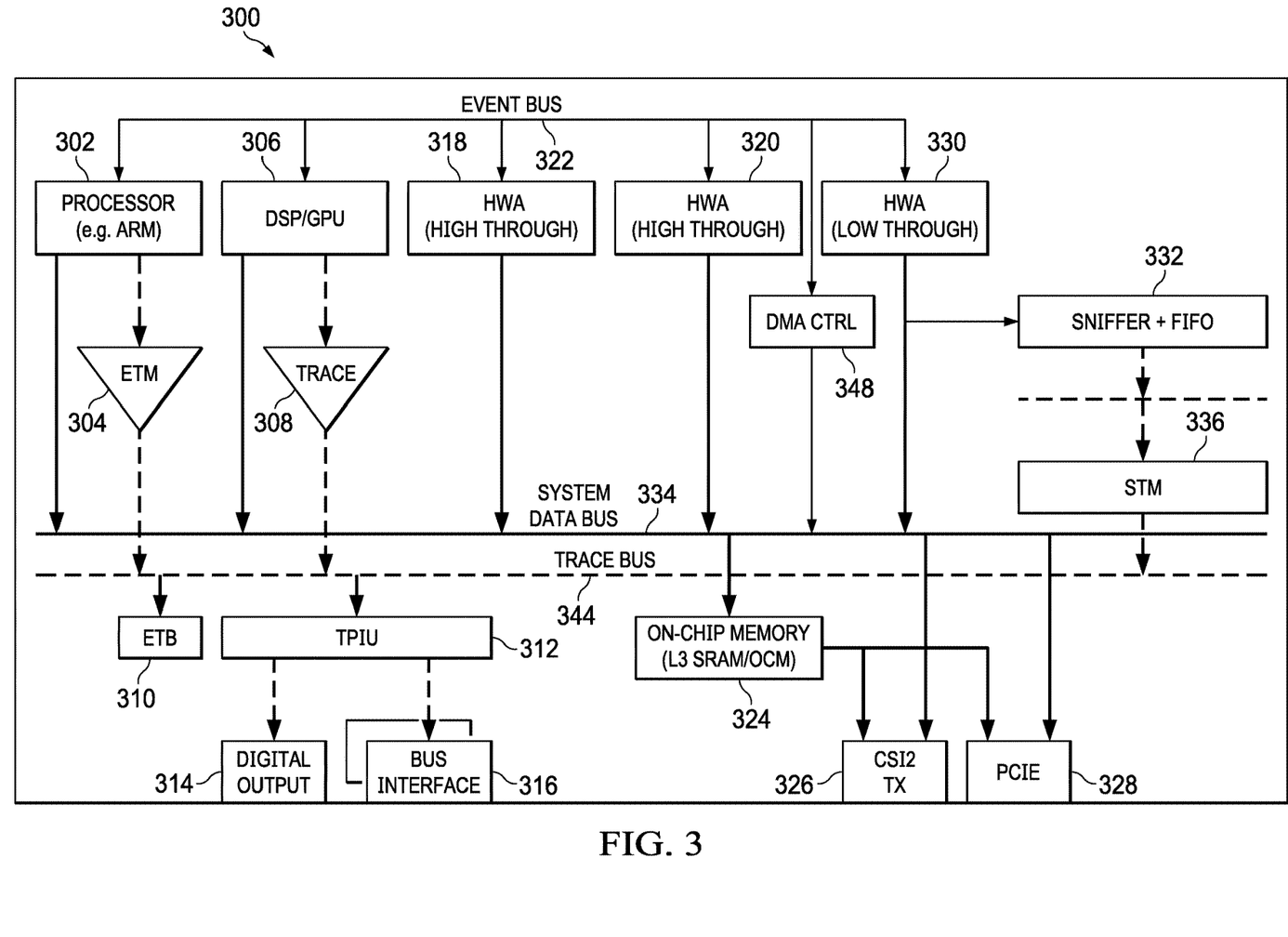
FIG. 3 depicts an example system-on-chip, according to one or more embodiments.

In some embodiments, multiple trace techniques may be employed on the same SoC. For example, a trace bus may be used for software trace and low throughput HWAs, whereas techniques described herein with respect to the on-chip memory may be used for high throughput HWAs. FIG. 3 depicts an example SoC 300 on which these techniques may be employed, according to one or more embodiments. SoC 300 may be used to implement the SOC 105 of FIG. 1. The SoC includes a processor 302 and another processor digital signal processor (DSP) and/or GPU 306 and HWAs such as 318, 320 and 330.

The processor 302 may be coupled to a first trace architecture, as shown at embedded trace macrocell (ETM) 304. Similarly, the DSP/GPU 306 may be connected to trace macrocell 308. Other various components used for tracing data from various tracing sources may be utilized. For example, a sniffer 332 sniffs the outgoing data (intended for the system data bus 334) from HWA 330. That sniffed data are transmitted over trace bus 344 using system trace macrocell (STM) 336. The collected trace data and corresponding timestamp(s) across all sources on trace bus 344 are collected in embedded trace buffer (ETB) 310. Collected trace from trace bus 344 is concurrently captured by trace port interface unit (TPIU) 312. From TPIU 312, the trace data and time stamp(s) exported to digital output pins 314 and/or high-speed bus interface 316 (e.g., Aurora) of SoC 300.

In addition, techniques described herein provide an alternative trace architecture, which may reside coincidently with the first trace architecture described above with respect to the low throughput masters on the SoC. This additional trace architecture includes using system data bus 334, on-chip memory 324, event bus 322, which provides communication across various components, such as high throughput HWAs 318 and 320, DMA controller (CTRL) 348 and communication interface PCIE 328 and/or CSI2 326. In some embodiments, event bus 322 may be configured to transmit signals across various high throughput providers, such as HWA 318 and HWA 320, along with other components, such as DMA controller 348. In some embodiments, the event bus 322 may connect other components not used for managing trace data for the high throughput HWAs, such as processor 302 and DPS/GPU 306.

The SoC 300 also includes a system data bus 334 configured to transmit live data and trace information among various components, including the HWA 318, HWA 320, DMA CTRL 348, on-chip memory 324 and interfaces, such as CSI2 TX 326 and (PCIE) 328. The high throughput HWAs 318 and 320 may receive data from various sources, such as from sensors within the same system as the SoC 300, from other HWAs, and the like. A high throughput HWA may be one which requires significant data flow, such as on the order of gigabytes per second. According to some embodiments, the HWAs 318 and 320 may be enhanced for tracing, for example, by including a scheduler, an event interface, and a DMA engine, as will be described below with respect to FIG. 5. On-chip memory 324 may be configured to be used for algorithm processing on the chip and may additionally be used to capture trace data. The share of on-chip memory 324 dedicated to algorithm processing and the share of on-chip memory dedicated to trace data may be defined in software, for example, based on the algorithm and/or trace data being managed. From the on-chip memory 324, interfaces such as CSI2 TX 326 or PCIE 328 can receive the trace data, for example, via DMA CTRL 348. As such, the data flow may be traced without interfering with the performance of the live data. The architecture presented in FIG. 3 therefore implements a tracing structure configured to operate in parallel with the flow of live data on the system data bus 334. As such, the functional data flow may be re-used without an additional output per buffer for trace in external memory. The result is a lower burden on CPU load (e.g., less than 1% of CPU load) per trace source.

Figure 4:
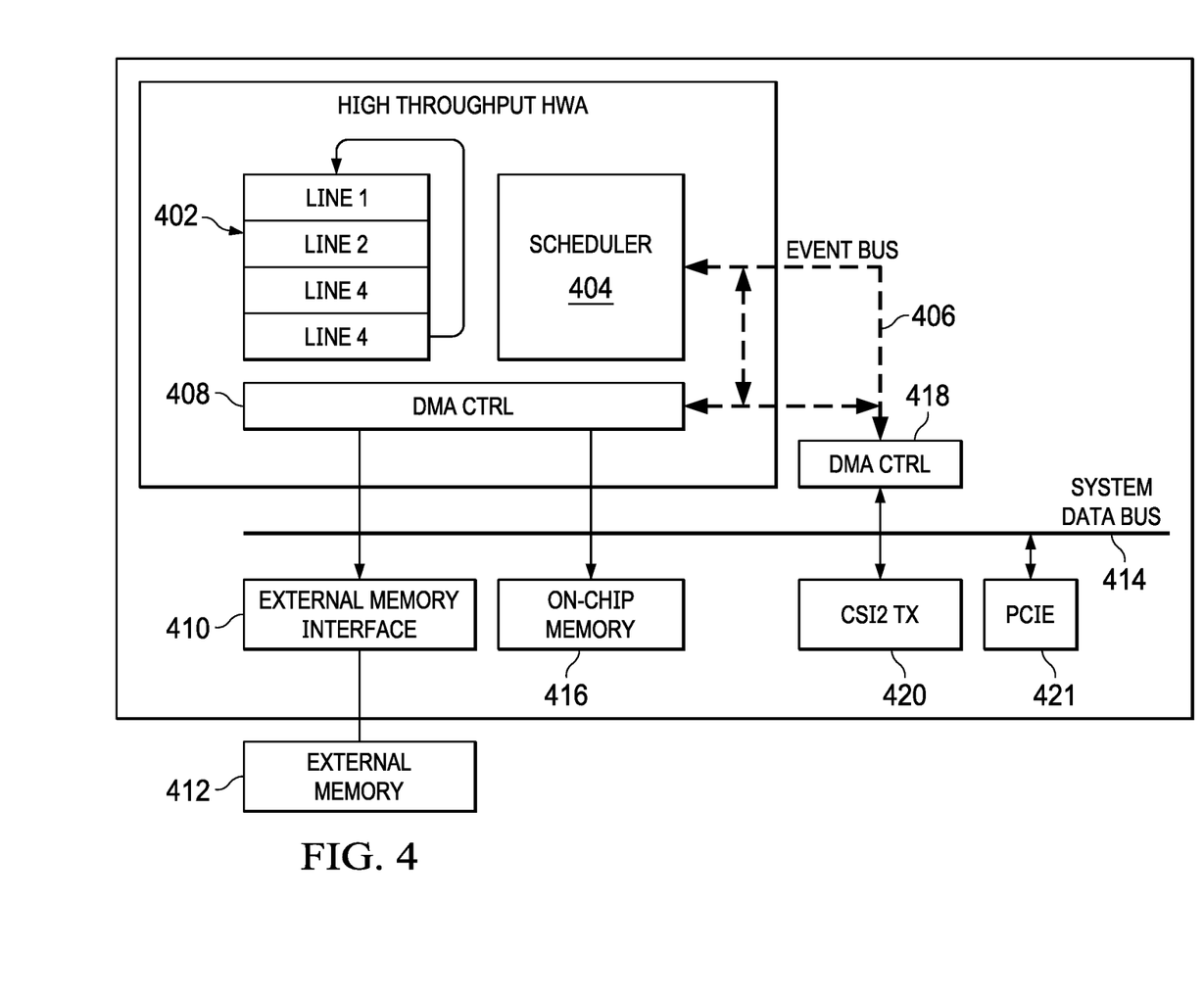
FIG. 4 depicts a system diagram of a technique for capturing and sending trace on a system-on-chip, according to one or more embodiments.

FIG. 4 shows another embodiment of an SoC and illustrates the flow of trace data therethrough. For purposes of this example, trace data is generated by HWA 400. HWA 400 may be configured to process data, for example, by applying algorithms related to machine vision techniques or other such algorithms. HWA 400 includes a buffer 402 and a scheduler 404, which is configured to manage buffer 402 on HWA 400. In addition, HWA 400 includes a DMA CTRL 408, which is coupled to scheduler 404 over an internal event bus 406, and is configured to transmit data out of buffer 402 across a system data bus 414. Scheduler 404, internal DMA CTRL 408 and SoC-level DMA CTRL 418 are connected to SoC-wide event bus 406. In some embodiments, there may be custom hardwire logic to perform data movement instead of generic DMA CTRL within HWA 400.

According to one or more embodiments, lines of data captured in buffer 402 are transferred to larger memory, such as external memory 412. The data may be captured, for example, from sensors, from other masters, and the like. To enable tracing, the scheduler 404 causes DMA CTRL 408 to transmit the data from the buffer 402 to an external memory interface 410 and an on-chip memory 416 across an event bus 406. In addition, DMA CTRL 408 may transmit the same particular set of data in smaller chunks (e.g., lines) along with trace header/footer information for the data to on-chip memory 416. DMA CTRL 408 may transmit and receive signals across the event bus 406 indicating the start and completion of transmission. The DMA CTRL 418 external to HWA 400 may receive the signal over the event bus 406 indicating that the first data and trace data have been transmitted to the on-chip memory. The signal may trigger DMA CTRL 418 to transmit the data with trace information from the on-chip memory 416 to an interface, such as CSI2 TX 420 and/or PCIE 421 for transmission out of the SoC.

DMA CTRL 418 transmits a signal across the event bus 406 when the transmission is complete. The scheduler 404 can track when a particular data chunk set has been transmitted to the external memory interface 410 as well as the second interface CSI2 TX 420 based on signals received over the event bus 406. In turn, the scheduler 404 can clear a particular data set from the buffer 402 when the received signals indicate that the data has been transmitted to the external memory interface 410 and to the second interface CSI2 TX 420.

Figure 5:
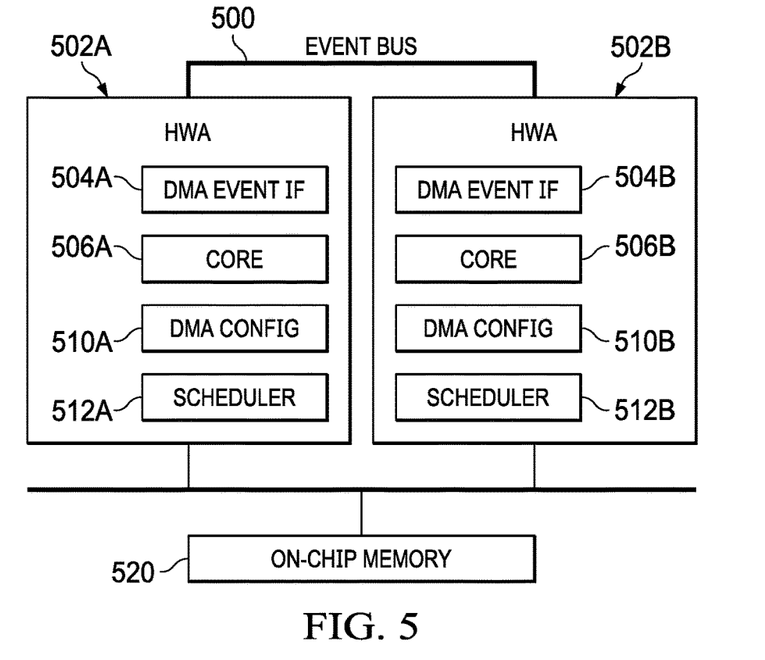
FIG. 5 depicts a system diagram of a technique for synchronizing data transmission across HWAs according to one or more embodiments.

In some embodiments, if the data generation rate from the HWA and consumption to send out external memory as well as communication interface are different, then flow control (speeding up or down at smaller chunk, i.e., line) is required. This requires special handling of the event within the HWA. FIG. 5 shows a diagram in which the event bus 500 connects a first high throughput master (HWA 502A) and a second high throughput master (HWA 502B). In an alternate scenario, the second high throughput master may be an SoC-level DMA controller sending trace data over a communication interface (e.g., PCIE or CSI2). For purposes of this example, the first high throughput master 502A is a producer and provides data to on-chip memory, whereas the second-high throughput master 502B is a consumer and reads data from on-chip memory in small chunks, i.e., lines. Each of the high throughput masters 502A and 502B may include a DMA event interface 504A and 504B configured to couple to DMA controllers within the system to perform flow control. For example, if the producer master 502A provides data faster than the consumer master 502B is using the data, that event that signaled back to consumption by consumer master 502B will be delayed, resulting in slowdown of producer 502A. DMA configuration 510A and 510B may include a software-programmable DMA controller, which configures how the DMA moves data within and around the system. Accordingly, the system can generate events in specific way to enable full performance by means of pipelining. This requires initially generating an event after more than one chunk (e.g., two lines), later one event per chunk (e.g., every line) and toward the end no event (e.g., last two lines). These three stages of event generation are pipe-up, steady state and pipe-down to transfer entire frame. In this case, DMA configuration 510A and 510B may be used to manage the ability to pipe up, pipe down, and steady state writes and reads at the line/block level. Scheduler 512A and 512B control the rate of movement and are responsible for synchronization within the HWA. Core 506A and 506B may include, for example, a processing algorithm and buffer used for a specific task. As described above, data can move from the cores 506A and 506B to the on-chip memory 520 across the event bus 500. The configuration described herein provides the ability to provide underflow and overflow notifications in case of real-time data transfer from the sensor. In case some embodiment, there may be custom hardwire logic to do data movement instead of the DMA controller within the HWA.

Figure 6:
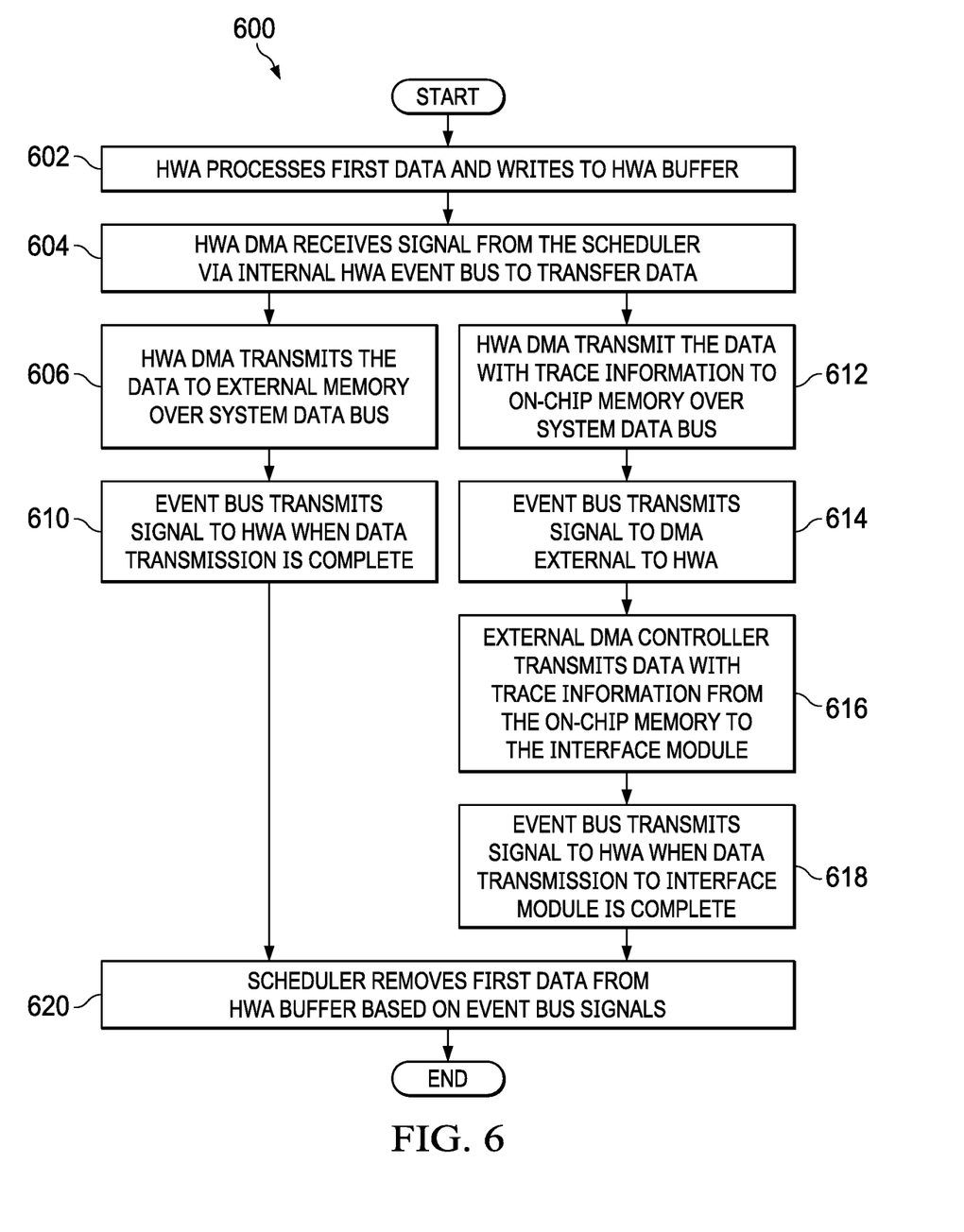
FIG. 6 depicts a flowchart of a technique for sending trace data, according to one or more embodiments.

FIG. 6 depicts a flowchart of a technique for managing trace data, according to one or more embodiments. Specifically, FIG. 6 depicts a technique for utilizing on-chip memory for collecting trace information related to one or more HWA functions and/or sensors. The flowchart depicts a series of steps in a particular order. However, it should be understood that the various steps may be performed in different order. Further, in some embodiments, additional steps may be included or some of the steps may be omitted. In addition, some of the steps may be performed concurrently in some embodiments. For purposes of clarity, the various steps will be described with reference to the components of FIGS. 1-5. However, it should be understood that alternative components may be used in some embodiments.

The flowchart 600 begins at block 602, where a first set of data is written to buffer 402 of HWA 400 on a chip. HWA may be a specialized component configured to perform a particular function. For example, in some embodiments, the HWA is configured to process sensor data to perform machine vision functions. The data may be stored on a buffer 402 within HWA 400 prior to being transmitted off the chip. For purposes of clarity, flowchart 600 describes a technique using a single HWA; however, it should be understood that multiple HWAs may be used for tracing according to some embodiments. Moreover, in some embodiments, the data written to the buffer may include other types of data, such as data from other accelerators or external memory. Further, in some embodiments, the HWA may transmit or receive data from sensors, other accelerators, or external memory.

The flowchart continues at block 604, where a DMA controller for the HWA receives a signal from the scheduler over an internal event bus indicating that the first set of data should be written out of the buffer. In some embodiments, the DMA controller reads and transmits a first amount of data that may be determined based on computer-readable instruction. For example, the amount of data transmitted by the DMA controller with each read may be programmable and software dependent. That is, the data may be transmitted from the buffer in transmission packets of a size that are software dependent. In some embodiments, the amount of data may be throttled based on events occurring within the SoC. The data may be transmitted, for example, at the line level, the slice level, or the frame level.

The flowchart continues at block 606, where the DMA of the HWA transmits the data from block 604 to an external memory over a system data bus. In particular, the DMA may transmit the first set of data to a memory interface associated with the external memory. In response to transmitting the data, the HWA DMA may transmit a signal over the event bus indicating the transmission is complete. The flowchart continues at block 610, where completion of transmission of a given chunk of data to the external memory is notified to the HWA over the event bus.

The HWA DMA may also transmit the data with trace information for the data to on-chip memory over the system data bus, as shown at block 612. As shown, the data may be transmitted to the external memory interface and the on-chip memory in parallel in small chunks (e.g., lines). For example, the transmissions may occur over different channels of the DMA controller over a system data bus. Notably, the on-chip memory may be a memory 416 on the SoC which is different and separate from a memory external to the SoC (i.e., external memory 412) onto which the sensor data and/or HWA data is gathered in entire frames by accumulating smaller chunks (e.g., lines). The flowchart continues at block 614, where the HWA DMA controller transmits a signal across the event bus indicating the transmission to the on-chip memory has occurred.

The flowchart continues at block 616 where a DMA controller external to the HWA receives the signal over the event bus indicating that the transmission to the on-chip memory is complete and transmits the data from the on-chip memory to an interface for transmittal out of the SoC. The interface may include, for example, CSI2 TX or PCIE, as shown at 420. Accordingly, the trace data may be provided to an external component via the interfaces. From there, the system can use the trace data, for example, for recording or testing systems using the sensors. At block 618, the external DMA controller causes a signal to be transmitted on the event bus indicating the transmission to the interface has occurred.

The flowchart concludes at block 620 where a scheduler within the HWA receives the signal over the event bus indicating the data transmission to the external memory is complete from block 610, and the signal over the event bus indicating transmission to the interface is complete at block 618. In response, the scheduler can clear the buffer of the data portion which was transmitted at 602 for additional sensor data.

The programmable processor (e.g., ARM) writes before start of trace data, header of trace and after transmission trace footer containing various information associated with trace data.

Figure 7:
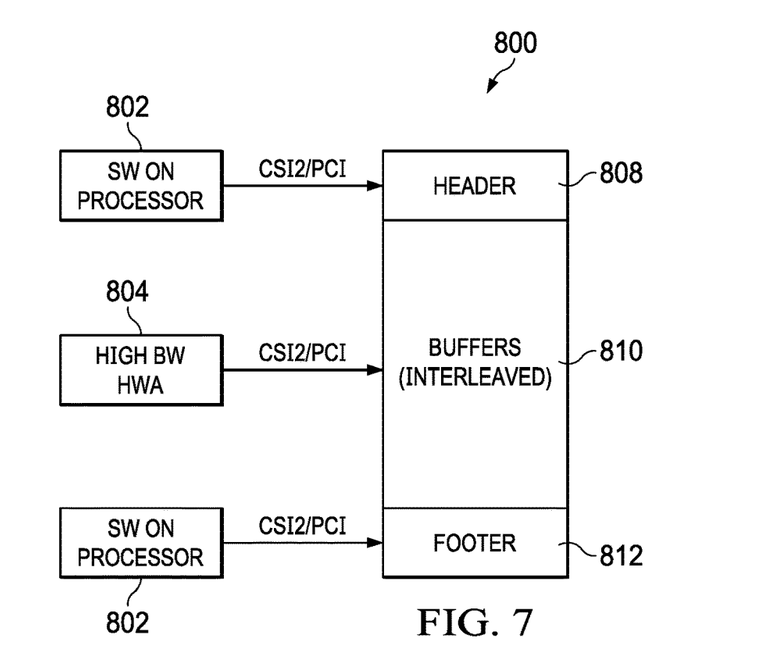
FIG. 7 depicts a flow diagram of a technique for providing header and footer information for trace data, according to one or more embodiments.

Trace information accompanies the traced data and includes information to identify time instance, producer, etc. This additional trace information is transmitted with the data, for example, from the buffer to the on-chip memory by the DMA controller of the HWA. As shown in the example of FIG. 7, a trace protocol may be utilized to facilitate the tracing of data from a given SoC. FIG. 7 depicts a data transmission 800 that includes sensor data 810 from HWA 804 that has been modified for enhanced tracing as per FIG. 5. The buffer data 810 may be modified by incorporating a header 808 and footer 812 which may include tracing information.

Examples of data that may be found in the header 808 include a Start Data identifier to identify the beginning and length of the header, for example, in bytes and a timestamp. The timestamp may be a 64-bit count, for example, and may be derived from an "always on" domain with a frequency of at least 10 MHz, for example. Header data may also include a number of buffers sent in the upcoming payload, a number of slices the current buffers are split and interleaved across multiple buffers, a buffer format, a buffer width (e.g., number of pixels), and a buffer height e.g., number of lines). Other information that may be included in the header includes an amount of line padding in each line (e.g., in pixels, an amount of lines padded in toward the end of the frame or buffer, a CRC signature of the header, and a string identifying the end of the header.

Examples of data that may be found in the footer 812 include a string indicating the start of the footer, a buffer slice status indicating whether errors have occurred during transmission of the slice, a CRC signature for the footer, and a string indicating the end of the footer. Software on the processor 802 may generate the header and footer.

Figure 8:
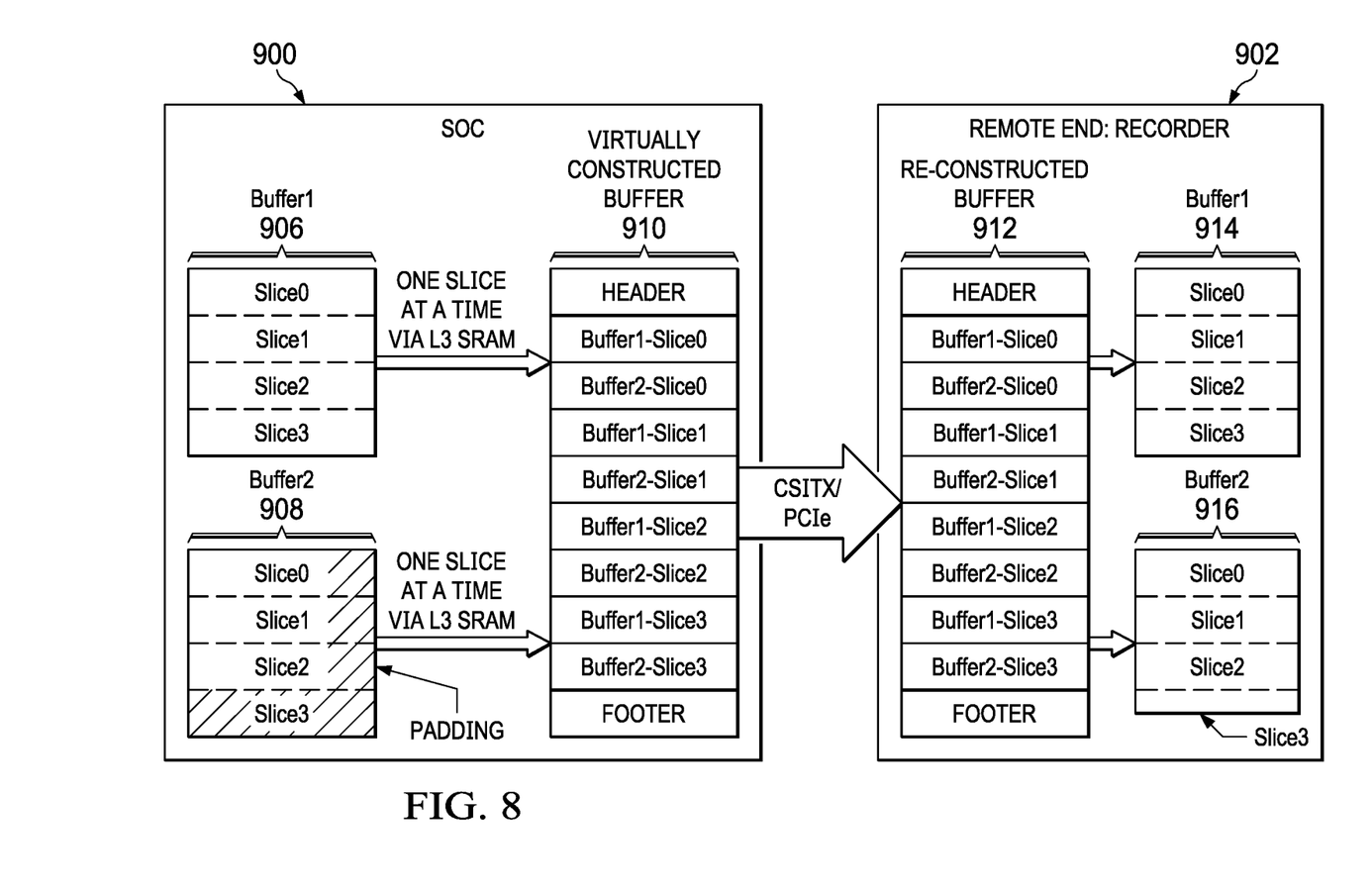
FIG. 8 depicts a detailed flow diagram of a technique for providing header and footer information for trace data, according to one or more embodiments.

Turning to FIG. 8, an example flow diagram is presented showing a technique for transmitting the trace data from the SOC 900 to a remote end recorder, such as an external memory 902. As described above, trace data may be traced from buffers of multiple HWAs and/or sensors. For purposes of this example, a first buffer 906 and a second buffer 908 are depicted. The data from the buffers may be written into on-chip memory in the form of a virtually constructed buffer 910. In some embodiments, the buffer data may be written one slice at a time via common on-chip memory of SoC. For purposes of the example shown, slices of the buffers may be interleaved into a virtually constructed buffer 910, which may be transmitted off the SoC. Accordingly, a first slice of each buffer is included in the transmission, followed by a second slice from each buffer, and the like. The virtually constructed buffer 910 includes a header and footer which, as described above, may contain trace information to allow for better management at the receiving end. Moreover, the header and footer may include information for reconstructing the buffer, such as padding information, as shown with respect to the second buffer 908.

As shown at the remote end 902, the virtually constructed buffer can be reconstructed after transmission to form reconstructed buffer 912. Accordingly, the remote end 902 will have interleaved slices of data from multiple buffers. As described above, the header and/or footer may contain trace information which allows for better management of the buffer data. In some embodiments, the trace information in the header will allow for demultiplexing of the buffer data into the original buffers.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuration may be through firmware and/or software programming of the device, through a construction and/or layout of hardware components and interconnections of the device, or a combination thereof.

What is claimed is:

1. A system-on-chip comprising:
a first memory device;
a first interface;
a first processing resource communicably coupled to the first interface and the first memory device, the first processing resource comprising:
 a data buffer; and
 a first direct memory access (DMA) controller configured to:
  transmit data from the data buffer to the first interface over a first channel, and
  transmit the data from the data buffer with associated trace information for the data to the first memory device over a second channel;
a second interface; and
a second DMA controller communicably coupled to the first processing resource, and configured to:
 transmit the data with the associated trace information from the first memory device to the second interface.

2. The system-on-chip of claim 1, further comprising a system data bus, wherein the first channel and the second channel transfers are carried over the system data bus.

3. The system-on-chip of claim 1, wherein the second interface comprises at least one selected from a group consisting of CSI2 TX interface, a PCIE interface and Display.

4. The system-on-chip of claim 1, further comprising an event bus communicably coupled to the first processing resource and the second DMA controller,
wherein the second DMA controller is configured to transmit the data with the associated trace information from the first memory device to the second interface in accordance with a first signal received over the event bus indicating the data from the data buffer with the associated trace information has been transmitted to the first memory device.

5. The system-on-chip of claim 4, wherein the first processing resource further comprises a scheduler, and wherein the scheduler is configured to:
receive a second signal from the event bus indicating that the transmission by the second DMA controller is complete for a particular data set;
receive a third signal from the event bus indicating that the transmission by the first DMA controller is complete for the particular data set; and
in accordance with receiving the second signal and the third signal, cause the particular data set to be removed from the data buffer.

6. The system-on-chip of claim 4, further comprising:
a second processing resource communicably coupled to the first processing resource across the event bus, the second processing resource comprising:
 a second data buffer; and
 a third DMA controller configured to:

read data from the first memory device and consume the read data; and cause a fourth signal to be transmitted across the event bus to the first processing resource indicating a data consumption rate by the second processing resource, wherein the first processing resource is further configured to modify a production rate in accordance with the fourth signal.

7. The system-on-chip of claim 6, further comprising:

a third processing resource having a lower throughput than the first processing resource and the second processing resource; and a trace bus, wherein additional data from the third processing resource is transmitted to a trace buffer via the trace bus.

8. A system, comprising:

a first hardware accelerator (HWA) comprising:
  a first buffer;
  a first scheduler communicably coupled to the first buffer; and
  a first direct memory access (DMA) controller;
a system data bus;
an event bus;
a first memory device coupled to the first HWA via the system data bus;
a second DMA controller coupled to the first HWA via the event bus;
a first interface coupled to the second DMA controller via the system data bus; and
a second interface coupled to the first HWA.

9. The system of claim 8, wherein the first DMA controller is configured to transmit data from the first buffer to the second interface and to the first memory device, and wherein the second DMA controller is configured to transmit data from the first memory device to the first interface.

10. The system of claim 8, wherein the first interface comprises at least one selected from a group consisting of a CSI2 TX interface, PCIE interface and/or Display interface.

11. The system of claim 8, wherein the second interface comprises external DRAM memory.

12. The system of claim 9, wherein the second DMA controller is configured to transmit a first data set from the first memory device to the first interface in accordance with receiving a signal via the event bus indicating the first data set is transmitted from the first buffer to the first memory device via the first DMA controller.

13. The system of claim 8, wherein the system further comprises:

a second HWA comprising:
  a second buffer;
  a second scheduler; and
  a third DMA controller,
wherein the second DMA controller is communicably coupled to the second HWA over the event bus and further configured to transmit data from the second buffer of the second HWA to the first memory device.

14. The system of claim 13, wherein the first HWA is configured to modify a processing rate based on a signal received via the event bus from the second HWA.

15. A method, comprising:

transmitting, by a first direct memory access (DMA) controller, a first data set from a buffer of a processing resource to a first interface and a second data set to a first memory device over a system data bus, wherein the second data set comprises the first data set and trace data for the first data set;

transmitting, by the first DMA controller, a first signal to a second DMA controller over an event bus, wherein the first signal indicates completion of the transmission of the first data set to the first interface;

transmitting, by the first DMA controller, a second signal to a scheduler for the buffer over the event bus, wherein the second signal indicates completion of the transmission of the second data set to the first memory device; and in response to the second signal:
  transmitting, by the second DMA, the second data set from the first memory device to a second interface over the system data bus; and
  transmitting, by the second DMA, a third signal to the scheduler for the buffer over the event bus, wherein the third signal indicates completion of the transmission of the second data set to the second interface.

16. The method of claim 15, further comprising, in response to receiving the first signal and the third signal, clearing, by the scheduler, the first data set from the buffer.

17. The method of claim 15, wherein the first DMA controller transmits the first data set over a first channel of the system data bus, and the first DMA controller transmits the second data set over a second channel of the system data bus.

18. The method of claim 15, further comprising generating the second data set by:

appending a header to the first data set, wherein the header comprises identifying information for the buffer.

19. The method of claim 15, further comprising:

in accordance with the second DMA controller transmitting the second data set from the first memory device, transmitting a fourth signal via the event bus to the scheduler, wherein the scheduler causes the first DMA controller to transmit a third data set from the buffer in response to the fourth signal.

20. The method of claim 15, wherein the processing resource is a first processing resource, the method further comprising:

receiving, by the processing resource, a fifth signal indicating a transmission rate of a second processing resource; and modifying a processing rate of the first processing resource in response to the received fifth signal.

\* \* \* \* \*